United States Patent
Young et al.

(10) Patent No.: US 10,152,364 B2
(45) Date of Patent: Dec. 11, 2018

(54) PREDICTING, DIAGNOSING, AND RECOVERING FROM APPLICATION FAILURES BASED ON RESOURCE ACCESS PATTERNS

(71) Applicant: Microsoft Technology Licensing, LLC, Redmond, WA (US)

(72) Inventors: Matthew David Young, Groton, MA (US); Kristofer Hellick Reierson, Acton, MA (US); Eric Jewart, Waltham, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 147 days.

(21) Appl. No.: 14/938,542

(22) Filed: Nov. 11, 2015

(65) Prior Publication Data
US 2016/0062817 A1 Mar. 3, 2016

Related U.S. Application Data

(63) Continuation of application No. 12/978,663, filed on Dec. 27, 2010, now Pat. No. 9,189,308.

(51) Int. Cl.
*G06F 11/00* (2006.01)
*G06F 11/07* (2006.01)
(Continued)

(52) U.S. Cl.
CPC .......... *G06F 11/0772* (2013.01); *G06F 9/542* (2013.01); *G06F 11/008* (2013.01);
(Continued)

(58) Field of Classification Search
CPC ............. G06F 11/0766; G06F 11/0769; G06F 11/0772; G06F 11/0775; G06F 11/0781;
(Continued)

(56) References Cited

U.S. PATENT DOCUMENTS 6,065,146 A    5/2000  Bosshart
6,149,887 A    11/2000 Lagas et al.
(Continued)

FOREIGN PATENT DOCUMENTS

JP    2005352673    12/2005
JP    2006053788    2/2006
(Continued)

OTHER PUBLICATIONS

Translated Chinese Office Action dated Feb. 28, 2014 for Chinese patent application No. 201110442035.7, a counterpart foreign application of U.S. Appl. No. 12/978,663, 16 pages.
(Continued)

*Primary Examiner* — Amine Riad
(74) *Attorney, Agent, or Firm* — Workman Nydegger

(57) ABSTRACT

Technologies are described herein for differentiating normal operation of an application program from error conditions to predict, diagnose, and recover from application failures. Access to resources by the application program is monitored, and resource access events are logged. Resource access patterns are established from the logged resource access events utilizing computer pattern recognition techniques. If subsequent access to resources by the application program deviates from the established patterns, then a user and/or administrator of the application program is notified of a potential error condition based on the detected deviation. In addition, sequences of resource access events that deviate from the established resources access patterns are correlated with an error condition based on a temporal proximity to the time of occurrence of the error to provide diagnostic information regarding the error.

20 Claims, 3 Drawing Sheets

(51) Int. Cl.
*G06F 9/54* (2006.01)
*G06F 11/34* (2006.01)

(52) U.S. Cl.
CPC ........ *G06F 11/079* (2013.01); *G06F 11/0721* (2013.01); *G06F 11/0754* (2013.01); *G06F 11/0793* (2013.01); *G06F 11/3452* (2013.01); *G06F 11/3476* (2013.01); *G06F 2201/865* (2013.01)

(58) Field of Classification Search
CPC .. G06F 11/0784; G06F 11/321; G06F 11/322; G06F 11/326; G06F 11/327; H04L 41/06; H04L 41/0686; H04L 41/5074
See application file for complete search history.

(56) References Cited

U.S. PATENT DOCUMENTS

| | | | |
|---|---|---|---|
| 6,360,344 B1 | 3/2002 | Khoche et al. | |
| 6,442,726 B1 | 8/2002 | Knefel | |
| 6,745,350 B1 | 6/2004 | Cline et al. | |
| 6,763,370 B1 | 7/2004 | Schmeidler et al. | |
| 6,938,096 B1 | 8/2005 | Greschler et al. | |
| 7,017,188 B1 | 3/2006 | Schmeidler | |
| 7,028,305 B2 | 4/2006 | Schaefer | |
| 7,103,625 B1 | 9/2006 | Hipp et al. | |
| 7,117,393 B2 | 10/2006 | Baba et al. | |
| 7,165,190 B1 | 1/2007 | Srivastava et al. | |
| 7,200,632 B1 | 4/2007 | Greschler et al. | |
| 7,225,264 B2 | 5/2007 | Croman et al. | |
| 7,243,267 B2 | 7/2007 | Klemm et al. | |
| 7,426,661 B2 | 9/2008 | Schaefer | |
| 7,451,451 B2 | 11/2008 | Schaefer | |
| 7,467,333 B2 | 12/2008 | Keeton et al. | |
| 7,590,743 B2 | 9/2009 | Willis | |
| 7,634,681 B2 | 12/2009 | Takamoto et al. | |
| 7,647,530 B2 | 1/2010 | Britt et al. | |
| 7,690,039 B2 | 3/2010 | Schmeidler et al. | |
| 7,707,641 B2 | 4/2010 | Schmeidler et al. | |
| 7,730,169 B1 | 6/2010 | Greschler et al. | |
| 7,770,064 B2 | 8/2010 | Harper et al. | |
| 7,774,647 B2 * | 8/2010 | Vertes ................. | G06F 11/3414 714/15 |
| 7,797,372 B2 | 9/2010 | Greschler et al. | |
| 7,921,341 B2 | 4/2011 | Abe | |
| 8,024,607 B2 | 9/2011 | Ladd et al. | |
| 8,069,374 B2 | 11/2011 | Panigrahy et al. | |
| 8,103,944 B2 | 1/2012 | Treigherman et al. | |
| 8,190,982 B2 | 5/2012 | Wang | |
| 2005/0102567 A1 | 5/2005 | McGuire et al. | |
| 2006/0242288 A1 | 10/2006 | Masurkar | |
| 2007/0220376 A1 | 9/2007 | Furukawa | |
| 2008/0250265 A1 | 10/2008 | Chang et al. | |
| 2009/0119549 A1 * | 5/2009 | Vertes ................. | G06F 11/3414 714/47.1 |
| 2009/0165135 A1 | 6/2009 | Lomont et al. | |
| 2009/0199178 A1 | 8/2009 | Keller et al. | |
| 2009/0222815 A1 | 9/2009 | Dake | |
| 2010/0058108 A1 | 3/2010 | Nammatsu et al. | |
| 2010/0211829 A1 | 8/2010 | Ziskind et al. | |
| 2010/0223499 A1 | 9/2010 | Panigrahy et al. | |
| 2011/0006808 A1 | 1/2011 | de Gruijl | |
| 2012/0166869 A1 | 6/2012 | Young et al. | |

FOREIGN PATENT DOCUMENTS

| | | |
|---|---|---|
| TW | 440776 | 6/2001 |
| TW | 513670 | 12/2002 |
| TW | 595161 | 6/2004 |
| TW | I240881 | 10/2005 |
| TW | I295782 | 4/2008 |
| TW | 200837558 | 9/2008 |
| WO | 2005008384 | 1/2005 |
| WO | 2006077249 | 7/2006 |

OTHER PUBLICATIONS

Translated Chinese Office Action dated Aug. 5, 2014 for Chinese patent application No. 201110442035.7, a counterpart foreign application of U.S. Appl. No. 12/978,663, 10 pages.

Translated Chinese Office Action dated Sep. 22, 2015 for Chinese patent application No. 201110442035.7, a counterpart foreign application of U.S. Appl. No. 12/978,663, 8 pages.

"International Search Report", dated Sep. 26, 2012, Application No. PCT/US2011J066821, Filed Date: Dec. 22, 2011, pp. 9.

Translated Japanese Office Action dated Jul. 28, 2015 for Japanese patent application No. 2013-547573, a counterpart foreign application of U.S. Appl. No. 12/978,663, 8 pages.

Neema, "Nas Virtualization", Jan. 2006, Available at http://www.comnews.com/WhitePaper_Library1Virtualization/pdfs/ExanetNASvirtualizaion.pdf, 4 pages.

"Online Backup and Recovery of Virtual Server Environments," Nov. 2008, Available at http://www.ironmountain.com/ resources/serverprotectlwp_online_backup_and_recovery.pdf, 8 pages.

Office Action from the U.S. Patent and Trademark Office for U.S. Appl. No. 12/978,663, dated Apr. 4, 2014, 10 pages.

Office Action from the U.S. Patent and Trademark Office for U.S. Appl. No. 12/978,663, dated Sep. 19, 2013, 20 pages.

Office Action from the U.S. Patent and Trademark Office for U.S. Appl. No. 12/978,663, dated Sep. 5, 2014, 9 pages.

Tatara, et al., "The Design and Evaluation of Anomaly Detection System Based on System Call", vol. 46, No. 8, Aug. 15, 2005, pp. 1967-1975.

Taiwanese Office Action dated Nov. 24, 2015 for Taiwanese patent application No. 100142750, a counterpart foreign application of U.S. Appl. No. 12/978,663, 7 pages.

"Office Action Issued in European Patent Application No. 11853294.4", dated Mar. 29, 2018, 7 Pages.

"Extended European Search Report issued in European Application No. EP85865RK900teg," dated Oct. 27, 2017.

* cited by examiner

PREDICTING, DIAGNOSING, AND RECOVERING FROM APPLICATION FAILURES BASED ON RESOURCE ACCESS PATTERNS

CROSS REFERENCE TO RELATED APPLICATIONS

This application is a continuation of co-pending U.S. application Ser. No. 12/978,663 filed Dec. 27, 2010, entitled "Predicting, Diagnosing, and Recovering from Application Failures Based on Resource Access Patterns," which is expressly incorporated herein by reference in its entirety.

BACKGROUND

Software applications executing on a computer system may fail for a wide variety of reasons, such as code bugs, user errors, bad input data, unavailable resources, or the like. Such application failures may result in loss of data and application downtime, and may incur costs and time related to recovery of the application and data. Applications running in a common environment or from a common installation may be expected to encounter the same failures given the same inputs, conditions, and/or circumstances. Such may be the case with applications running in a virtualized application environment.

Application virtualization allows software applications executed by a computer to be decoupled from the hardware, operating system ("OS"), and local configuration of the computer. Application virtualization may remove the requirement for an application to be installed, configured, and maintained locally on the computer. Instead, a virtual application environment may execute on the computer and stream the application components across a network from a virtualized application package maintained centrally on a virtual application server.

It is with respect to these considerations and others that the disclosure made herein is presented.

SUMMARY

Technologies are described herein for differentiating normal operation of an application program from error conditions to predict, diagnose, and recover from application failures. When an application program is running in a virtual application environment, the virtualization layer or virtual application environment may have knowledge of and control over requests the application makes for resources, such as reads from data files, writes to registry keys, and the like. Utilizing the technologies described herein, the virtualization layer may log accesses to resources and, over time, establish common patterns of resource usage. Once such resource access patterns are established, the virtualization layer may continue to monitor resource usage by the application program and provide a warning or alert when the patterns change. This proactive warning may provide the user of the application program or an administrator a chance to take diagnostic or corrective actions quickly, thus reducing or even preventing downtime and data loss.

It will be appreciated that application programs typically have a means of displaying errors to the user or administrator, like a pop-up dialog or an event logged in an application or system event log. The quality and utility of these error messages, however, may vary dramatically from application to application. Providing high-quality error messages that allow the source of the error to be determined requires a significant investment, and not all software vendors make this investment. Leveraging the log of accesses to resources and common patterns established described herein to correlate which resources were being accessed or how the pattern changed just before the error condition may allow users and/or administrators to more quickly diagnose application failures and implement recovery actions, reducing application downtime.

In addition, because the virtualization layer is aware of all resource usage by the application program, it can log resource additions, modifications, or deletions along with the data used in these resource modifications that occur over time. If the application program fails, a second instance of the application program can be started immediately and the log of resource modifications and data can be replayed, thus restoring the application state to a point just before failure of the first instance of the application. Such rapid failover between application instances may limit further downtime.

According to embodiments, access to resources by the application program executing in a virtual application environment is monitored, and resource access events are logged in a resource access log. Resource access patterns are established from the logged resource access events utilizing computer pattern recognition techniques. If subsequent access to resources by the application program deviates from the established patterns, then a user and/or administrator of the application program is notified of a potential error condition based on the detected deviation.

Further, sequences of resource access events that deviate from the established resources access patterns may be correlated with an error condition based on a temporal proximity to the time of occurrence of the error condition to provide diagnostic information to the user and/or administrator regarding the error. Finally, resource access events regarding the addition, modification, or deletion of data logged in the resource access log may be replayed in the event of an application failure and subsequent restart of the application to re-establish the application state of the application program.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for differentiating normal operation of an application program from error conditions based on patterns of resource access in order to predict, diagnose, and/or recover from application failures. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof and that show, by way of illustration, specific embodiments or examples. In the accompanying drawings, like numerals represent like elements through the several figures.

Figure 1:
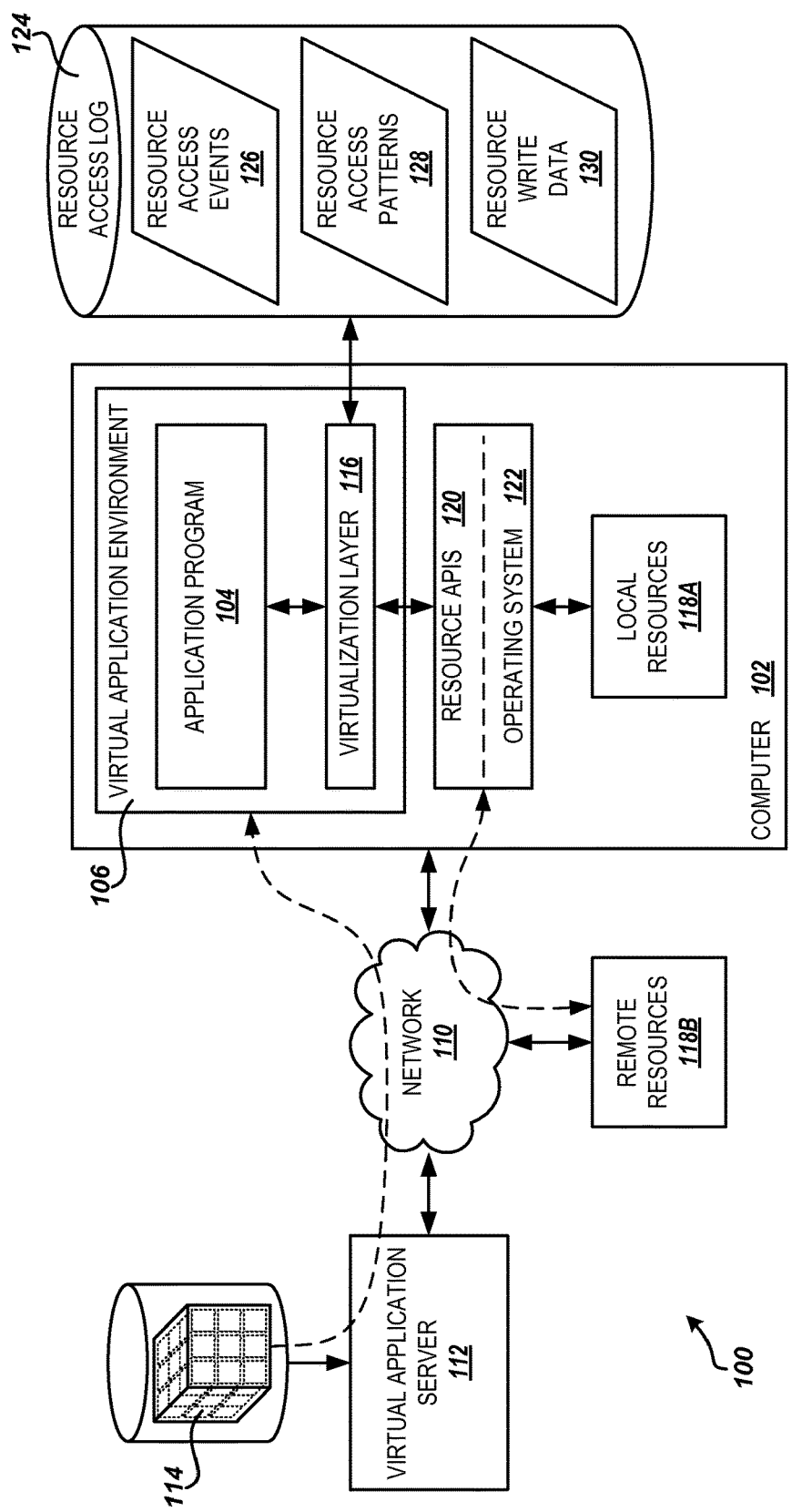
FIG. 1 is a block diagram showing aspects of an illustrative operating environment and several software components provided by the embodiments presented herein.

FIG. 1 shows an illustrative operating environment 100 including several software components for differentiating normal operation of an application program from error conditions to predict, diagnose, and recover from application failures, according to embodiments provided herein. The environment 100 includes a computer 102. The computer 102 may be a server computer; a personal computer ("PC"), such as a desktop workstation, a laptop, or a notebook; a personal digital assistant ("PDA"); a wireless telephone; a set-top box; a gaming console; or any other computing device that can execute application programs.

A software application program 104 executes on the computer 102. According to embodiments, the application program 104 may execute inside a virtual application environment 106. The virtual application environment 106 may allow the computer 102 to launch and execute application programs that have not been previously installed on the computer. The virtual application environment 106 may instead stream the components of the application program 104 in real-time or near real-time over a network 110 from a virtual application server 112. The virtual application environment 106 and virtual application server 112 may be based upon the MICROSOFT® APP-V technology from MICROSOFT Corporation of Redmond, Wash., the CITRIX XENAPP™ technology from CITRIX SYSTEMS Inc. of Fort Lauderdale, Fla., or any other application streaming and virtualization platform or technologies. The network 110 may be a LAN, a wide-area network ("WAN"), the Internet, or any other networking topology that connects the computer 102 to the virtual application server 112.

The software components of the application program 104 may be stored in a virtualized application package 114 located on a storage device accessible by the virtual application server 112. According to embodiments, the virtualized application package 114 consists of a number of blocks of data that contain application program structure information as well as the individual component files and other elements of the application. The virtualized application package 114 may further contain metadata regarding the location and configuration of local and remote resources utilized by the application program 104 during execution. The virtualized application package 114 may be created by an administrator of the application program 104 by performing a typical installation of the application on a management server and recording the changes made to the local file system, registry, and other, for example. The blocks in the virtualized application package 114 may then be streamed to the virtual application environment 106 to allow the application program 104 to be executed on the computer 102

The virtual application environment 106 may create a separate virtual runtime environment, referred to as an "application sandbox," to execute each application program 104 streamed from the virtual application server 112. The application sandbox allows the components of the application program 104 to execute in isolation from the remainder of the system. The virtual application environment 106 may further provide a virtualization layer 116 that abstracts access to local resources 118A and remote resources 118B (referred to herein generally as resources 118) utilized by the application program 104 during execution. The resources 118 may include system memory, local processor time or processing threads, files stored in a file system, data stored in a registry database, application services, presentation services, database services, and the like available locally on the computer 102 or remotely across the network 110.

The application program 104 may access the local and remote resources 118 through resource application programming interfaces ("APIs") 120 implemented by an operating system 122 or other standard software libraries installed on the computer 102. According to embodiments, the virtualization layer 116 abstracts the resource APIs 120 in order monitor and control access requests to the local and remote resources 118 by the application program 104 executing in the virtual application environment 106. In addition, the virtualization layer 116 may log access to the resources 118 by the application program 104 in a resource access log 124. The resource access log 124 may comprise a log file in the local file system, a number of database tables on a remote database server, a combination of the two, or any other data storage system accessible by the computer 102.

The resource access log 124 may contain a log of resource access events 126. The resource access events 126 may include details of calls to the resource APIs 120 made by the application program 104 executing in the virtual application environment 106. Each of the resource access events 126 may include a timestamp indicating when the resource access occurred, an identifier of the individual resource API 120 called, and a number of parameter values indicating the resource type, location, or other aspects of the local or remote resources 118 being accessed. The resource access events 126 may be stored as an entries in a log file, as rows in a database table, as objects in a dictionary, or in any other data structure or format known in the art.

In one embodiment, the resource access log 124 further contains resource access patterns 128. The resource access patterns 128 may comprise patterns of resource access by the application program 104 that regularly occur. For example, the application program 104 may read a particular registry key at time T1 and then write to a particular file located on a remote file system at time T1+240 msec. Further this pattern of reading the registry key and writing to the file may occur more than once, either in response to a particular event or condition, periodically, or at a particular time of day, for example. Resource access patterns 128 may be established between specific API calls, between API calls for specific resources, or between API calls for specific quantities of resources, such as an amount of memory allocated or a number of threads started, for example.

The resource access patterns 128 may be established from the resource access events 126 collected over some period of time using pattern recognition techniques. For example, a subset of event types may be determined to be important, and Bayesian learning techniques may be utilized to establish the resource access patterns 128 across those types of resource access events 126 within the collection period. The generated resource access patterns 128 may be stored as Markov chains or probability trees indicating a relative probability of occurrence between the resource access events, for example.

According to one embodiment, the resource access patterns 128 may be generated in near-real-time on the computer from the log of resource access events 126 in a background process running in parallel to the execution of the application program 104. In another embodiment, resource access events 126 logged by the virtualization layer 116 on a number of computers 102 executing the application program 104 in the virtual application environment 106 may be aggregated at a central location. The aggregated event data may be genericized, by removing computer-dependent resource paths, for example, and resource access patterns 128 may be established from the aggregated and genericized event data. The generated resource access patterns 128 may then be sent to each of the computers 102 executing the application program 104 in order for the patterns to be utilized in predicting application failures, as will be described in more detail below in regard to FIG. 2.

In a further embodiment, the resource access log 124 also contains resource write data 130. The resource write data 130 may contain a log of calls by the application program 104 to resource APIs 120 that add, modify, or delete data, such as a registry value write or an I/O buffer write. The resource write data 130 may contain a "deep copy" from pointers or structure-type parameters in order to include the data being written. In addition, any filename, key name, address, or other location parameters may be genericized using the current context of the executing application program 104. It will be appreciated that the resource write data 130 and the resource access events 126 may be integrated into a single log file or other structure in the resource access log 124. The resource write data 130 may be utilized to restore the application state of the application program 104 during recovery from an application failure, as will be described in more detail below in regard to FIG. 4.

Figure 4:
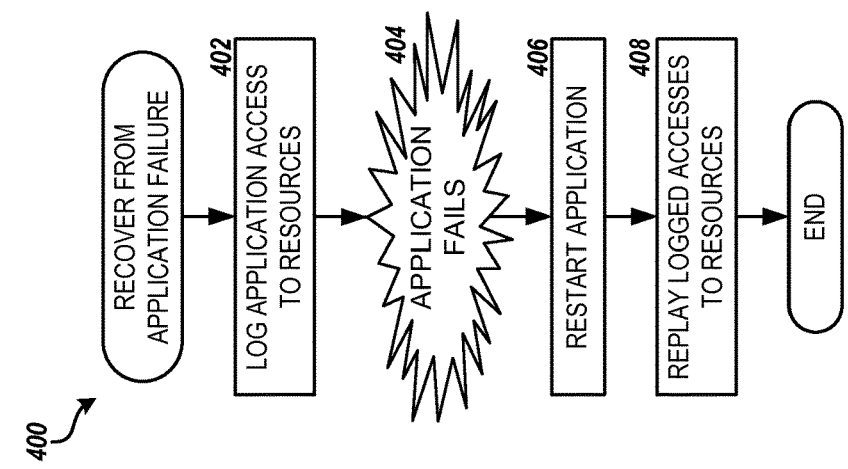
FIGS. 2-4 are flow diagrams showing methods for differentiating normal operation of an application program from error conditions to predict, diagnose, and recover from application failures, according to embodiments described herein.
Figure 3:
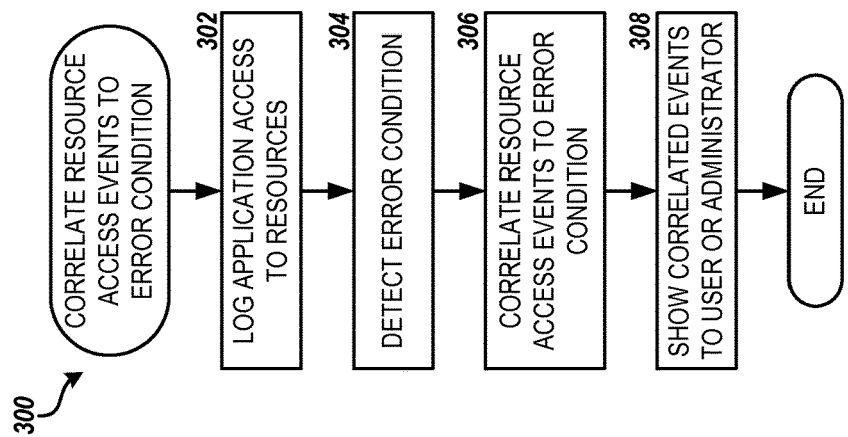
Figure 2:
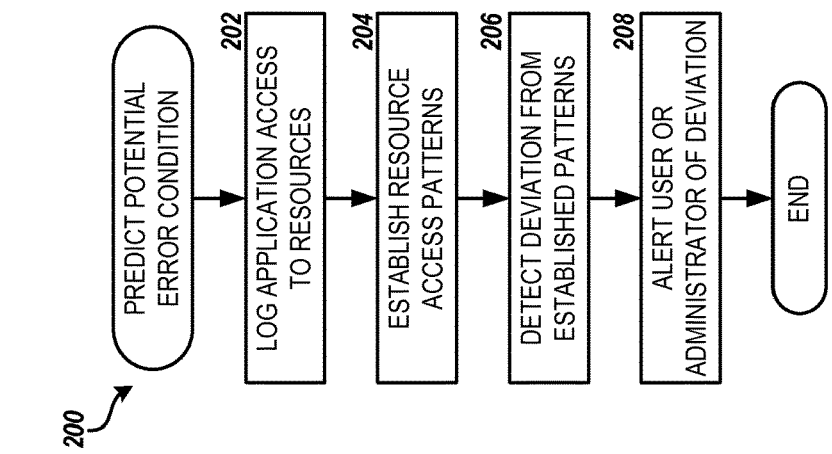

Referring now to FIGS. 2-4, additional details will be provided regarding the embodiments presented herein. It should be appreciated that the logical operations described with respect to FIGS. 2-4 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. The operations may also be performed in a different order than described.

FIG. 2 illustrates a routine 200 for predicting potential error conditions in the application program 104 based on a deviation from established patterns of resources access, according to embodiments described herein. The routine 200 may be performed by a combination of the virtualization layer 116 executing in the virtual application environment 106 on the computer 102 and/or other modules executing on the computer or on centralized application servers. It will be appreciated that the routine 200 may also be performed by other modules or components executing on other computing devices, or by any combination of modules, components, and computing devices.

The routine 200 begins at operation 202, where the virtualization layer 116 monitors access to local and remote resources 118 by the application program 104 executing in the virtual application environment 106, and logs these accesses to the resource access log 124. As described above in regard to FIG. 1, the virtualization layer 116 may log details of calls by the application program 104 to the resource APIs 120 as resource access events 126, including the timestamp indicating when the resource access occurred, an identifier of the individual resource API called, and a number of parameter values indicating the resource type, location, or other aspects of the local or remote resources 118 being accessed.

From operation 202, the routine 200 proceeds to operation 204, where resource access patterns 128 are established. It will be appreciated that, over some period of time, a significant number of resource access events 126 may be logged in the resource access log 124 by the virtualization layer 116. As described above in regard to FIG. 1, the virtualization layer 116 or some other module or process may utilize the logged resource access events 126 to establish the resource access patterns 128. For example, the virtualization layer 116 may utilize pattern recognition techniques, such as Bayesian networks, to establish the relative probabilities of occurrence between two or more resource access events. The established resource access patterns 128 may be then be stored as Markov chains or probability trees in the resource access log 124.

The resource access patterns 128 may be generated in near-real-time on the computer 102 by the virtualization layer 116. Alternatively, logged resource access events 126 may be aggregated from a number of computers 102 at a central location, genericized, and utilized to establish resource access patterns 128 across multiple instances of the application program 104 executing in the virtual application environment 106 across the computers. The generic resource access patterns 128 established from the aggregated resource access events 126 may then be utilized to predict error conditions on any computer 102 executing the application program 104 in the manner described herein.

The routine 200 proceeds from operation 204 to operation 206, where the virtualization layer 116 detects a deviation from the established resource access patterns 128 by the application program 104 executing in the virtual application environment 106. For example, the virtualization layer 116 may detect a sequence of resource API calls that has a probability of occurrence below a specified threshold based on Bayesian analysis of the resource access patterns 128. Similarly, the virtualization layer 116 may detect a sequence of resource API calls that has a high probability of occurrence with a known error condition, as established in the resource access patterns 128. In one embodiment, if the probability of the sequence of resource API calls does not fall below the specific threshold, then the virtualization layer 116 logs the corresponding resource access events 126 so that the resource access patterns 128 may be updated with new probabilities in the background process described above. In this way, the resource access patterns 128 may be continually updated during execution of the application program 104 in the virtual application environment 106.

If a deviation from the established resource access patterns 128 by the application program 104 is detected, then the routine 200 proceeds from operation 206 to operation 208, where the virtualization layer 116 raises an alert regarding the deviation in the pattern. The alert may be directed to a user or administrator of the application program 104. The alert may be sent via e-mail, text message, or system message queue; raised as a system level event; logged in an application or system event log, or otherwise transmitted to the administrator via a messaging system accessible by the computer 102. This proactive alert may give the administrator a chance to take diagnostic or corrective actions quickly, reducing or perhaps preventing downtime and data loss in the wake of a potential, pending error condition. From operation 208, the routine 200 ends.

FIG. 3 illustrates a routine 300 for correlating resource access events 126 with a known error condition in the application program 104 to allow diagnostics of the error, according to embodiments described herein. The routine 300 may be performed by a combination of the virtualization layer 116 executing in the virtual application environment 106 on the computer 102 and/or other modules executing on the computer or on centralized application servers. It will be appreciated that the routine 300 may also be performed by other modules or components executing on other computing devices, or by any combination of modules, components, and computing devices.

The routine 300 begins at operation 302, where the virtualization layer 116 monitors access to local and remote resources 118 by the application program 104 executing in the virtual application environment 106 and logs these accesses to the resource access log 124, in the manner described above in regard to operation 202. The routine 300 then proceeds to operation 304, where an error condition in the application program 104 is detected. For example, the error condition may be detected in the application program 104 by a user or administrator of the application program through traditional means, such as a pop-up error dialog, an event logged in an application or system event log, or the like.

From operation 304, the routine 300 proceeds to operation 306, where resource access events 126 in the resource access log 124 are correlated with the detected error condition. The administrator may provide a time of occurrence of the error condition, or the time of occurrence of the error condition may be identified from specific calls to resource APIs 120 logged in the resource access events 126. The virtualization layer 116 or other module may then identify a subset of resource access events 126 in the resource access log 124 within a temporal proximity to the time of occurrence of the error condition. For example, all resource access events 126 that occurred within a 10 second window leading up to the error condition may be correlated with the error condition.

In one embodiment, only sequences of resource API calls logged in the resource access events 126 within the temporal proximity to the error condition that deviate from established resource access patterns 128 are correlated with the error condition. For example, the virtualization layer 116 or other module may identify sequences of resource API calls logged in the resource access events 126 within 10 seconds of the time occurrence of the error condition that have a probability of occurrence below a specified threshold based on Bayesian analysis of the resource access patterns 128 in the resource access log 124. It will be appreciated that the specified threshold of probability for correlating deviations in resource access patterns 128 with an error condition may be higher than the threshold of probability for predicting an error condition based on deviations in resource access patterns described above in regard to operation 206.

The routine 300 then proceeds from operation 306 to operation 308, where the resource access events 126 correlated with the error condition are shown to the user or administrator of the application program 104. The correlated resource access events 126 may be shown through a user interface dialog or in a report transmitted via e-mail, text message, system message queue, or the like. Providing resource access events 126 from the resource access log 124 that are correlated in time with a particular error condition may allow the user or administrator to quickly diagnose the cause of the error condition and implement the appropriate recovery actions in order to reduce downtime and data loss. From operation 308, the routine 300 ends.

FIG. 4 illustrates a routine 400 for recovering from an error condition in an application program 104, according to embodiments described herein. The routine 400 may be performed by a combination of the virtualization layer 116 executing in the virtual application environment 106 on the computer 102 and/or other modules executing on the computer or on centralized application servers. It will be appreciated that the routine 400 may also be performed by other modules or components executing on other computing devices, or by any combination of modules, components, and computing devices.

The routine 400 begins at operation 402, where the virtualization layer 116 monitors access to local and remote resources 118 by the application program 104 executing in the virtual application environment 106 and logs these accesses to the resource access log 124, in the manner described above in regard to operation 202. In addition, the virtualization layer 116 logs resource write data 130 for calls by the application program 104 to resource APIs 120 that add, modify, or delete data, as described above in regard to FIG. 1. The resource write data 130 may include a deep copy from pointers or structure-type parameters specified in the API calls, and the data may be further processed using the current context of the executing application program 104 to genericize filename, key name, address, or other location parameters in the resource write data 130.

From operation 402, the routine 400 proceeds to operation 404, where the application program 104 fails due to an error condition. For instance, the application program 104 may fail because of a software bug, a user error, bad input data, unavailable resources, a hardware failure in the computer 102, or the like. Upon failure of the application program 104, the routine 400 moves to operation 406, where the application program 104 is restarted. The application program 104 may be restarted automatically by the virtualization layer 116 or another module executing on the computer 102, or it may be restarted manually by a system administrator on the same computer or another computer system with similar configuration.

The routine 400 proceeds from operation 406 to operation 408, where the virtualization layer 116 executing in the virtual application environment 106 on the computer 102 where the application program 104 was restarted replays certain resource access events 126 logged in the resource access log 124 in order to restore the application state to a point before the failure occurred. For example, the virtualization layer 116 may replay all resource access events 126 corresponding to calls to resource APIs 120 that write to volatile or cached storage locations, such as system memory addresses, I/O buffers, cached files, or the like.

In a further embodiment, the virtualization layer 116 may replay all resource access events 126 corresponding to the writing of data that occurred since a last snapshot of the application state, or "checkpoint," was taken and stored by the virtualization layer and/or application program 104 before the application failure. The virtualization layer 116 may utilize the resource write data 130 in the resource access log 124 to replay the selected resource access events 126, in order to ensure the proper data is written in restoring the application state. Logging resource access events 126 that add, modify, or delete data along with the corresponding resource write data 130 in order to replay the writes to restore application state may allow for faster recovery from application failures, thus reducing application downtime. From operation 408, the routine 400 ends.

While the present disclosure is described in the context of a virtualized application environment 106, it will be appreciated that the methods presented herein for differentiating normal operation of an application program from error conditions to predict, diagnose, and recover from application failures may be implemented in any other application environment where the access of application programs 104 to local and remote resources 118 may be monitored. For example a module similar to the virtualization layer 116 may be implemented that utilizes methods known in the art to hook the resources APIs 120 implemented by the operating system 122 in order to monitor requests for local and remote resources 118 by a locally executing applications program 104 outside of a virtual application environment 106. The module may log the accesses to the resources and establish common patterns of resource usage by the application program 104. Once such resource access patterns are established, the module may continue to monitor resource usage by the application program 104 and provide a warning or alert when the patterns change, in the manner described herein.

Figure 5:
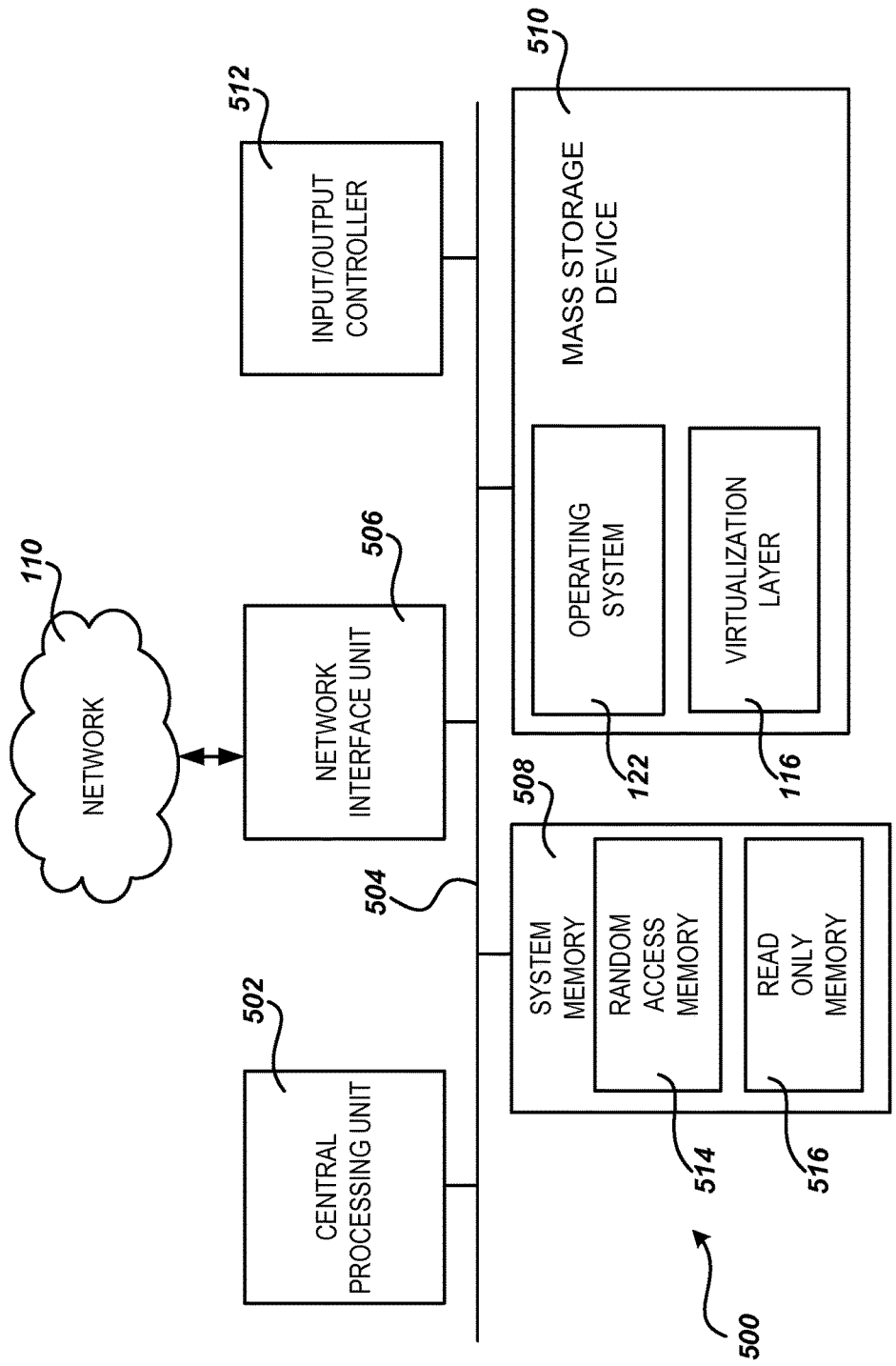
FIG. 5 is a block diagram showing an illustrative computer hardware and software architecture for a computing system capable of implementing aspects of the embodiments presented herein.

FIG. 5 shows an example computer architecture for a computer 500 capable of executing the software components described herein for differentiating normal operation of an application program from error conditions to predict, diagnose, and recover from application failures, in the manner presented above. The computer architecture shown in FIG. 5 illustrates a conventional server computer, desktop computer, laptop, notebook, PDA, wireless phone, or other computing device, and may be utilized to execute any aspects of the software components presented herein described as executing on the computer 102 or other computing device.

The computer architecture shown in FIG. 5 includes one or more central processing units ("CPUs") 502. The CPUs 502 may be standard processors that perform the arithmetic and logical operations necessary for the operation of the computer 500. The CPUs 502 perform the necessary operations by transitioning from one discrete, physical state to the next through the manipulation of switching elements that differentiating between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and other logic elements.

The computer architecture further includes a system memory 508, including a random access memory ("RAM") 514 and a read-only memory 516 ("ROM"), and a system bus 504 that couples the memory to the CPUs 502. A basic input/output system containing the basic routines that help to transfer information between elements within the computer 500, such as during startup, is stored in the ROM 516. The computer 500 also includes a mass storage device 510 for storing an operating system 122, application programs, and other program modules, which are described in greater detail herein.

The mass storage device 510 is connected to the CPUs 502 through a mass storage controller (not shown) connected to the bus 504. The mass storage device 510 provides non-volatile storage for the computer 500. The computer 500 may store information on the mass storage device 510 by transforming the physical state of the device to reflect the information being stored. The specific transformation of physical state may depend on various factors, in different implementations of this description. Examples of such factors may include, but are not limited to, the technology used to implement the mass storage device, whether the mass storage device is characterized as primary or secondary storage, and the like.

For example, the computer 500 may store information to the mass storage device 510 by issuing instructions to the mass storage controller to alter the magnetic characteristics of a particular location within a magnetic disk drive, the reflective or refractive characteristics of a particular location in an optical storage device, or the electrical characteristics of a particular capacitor, transistor, or other discrete component in a solid-state storage device. Other transformations of physical media are possible without departing from the scope and spirit of the present description. The computer 500 may further read information from the mass storage device 510 by detecting the physical states or characteristics of one or more particular locations within the mass storage device.

As mentioned briefly above, a number of program modules and data files may be stored in the mass storage device 510 and RAM 514 of the computer 500, including an operating system 518 suitable for controlling the operation of a computer. The mass storage device 510 and RAM 514 may also store one or more program modules. In particular, the mass storage device 510 and the RAM 514 may store the virtualization layer 116, which was described in detail above in regard to FIG. 1. The mass storage device 510 and the RAM 514 may also store other types of program modules or data.

In addition to the mass storage device 510 described above, the computer 500 may have access to other computer-readable media to store and retrieve information, such as program modules, data structures, or other data. It should be appreciated by those skilled in the art that computer-readable media may be any available media that can be accessed by the computer 500, including computer-readable storage media and communications media. Communications media includes transitory signals. Computer-readable storage media includes volatile and non-volatile, removable and non-removable media implemented in any method or technology for the storage of information, such as computer-readable instructions, data structures, program modules, or other data. For example, computer-readable storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium that can be used to store the desired information and that can be accessed by the computer 500.

The computer-readable storage medium may be encoded with computer-executable instructions that, when loaded into the computer 500, may transform the computer system from a general-purpose computing system into a special-purpose computer capable of implementing the embodiments described herein. The computer-executable instructions may be encoded on the computer-readable storage medium by altering the electrical, optical, magnetic, or other physical characteristics of particular locations within the media. These computer-executable instructions transform the computer 500 by specifying how the CPUs 502 transition between states, as described above. According to one embodiment, the computer 500 may have access to computer-readable storage media storing computer-executable instructions that, when executed by the computer, perform the routines 200, 300, and/or 400 for differentiating normal operation of an application program from error conditions to predict, diagnose, and recover from application failures, described above in regard to FIGS. 2-4.

According to various embodiments, the computer 500 may operate in a networked environment using logical connections to remote computing devices and computer systems through the network 110, such as a LAN, a WAN, the Internet, or a network of any topology known in the art. The computer 500 may connect to the network 110 through a network interface unit 506 connected to the bus 504. It should be appreciated that the network interface unit 506 may also be utilized to connect to other types of networks and remote computer systems.

The computer 500 may also include an input/output controller 512 for receiving and processing input from a number of input devices, including a keyboard, a mouse, a touchpad, a touch screen, an electronic stylus, or other type of input device. Similarly, the input/output controller 512 may provide output to a display device, such as a computer monitor, a flat-panel display, a digital projector, a printer, a plotter, or other type of output device. It will be appreciated that the computer 500 may not include all of the components shown in FIG. 5, may include other components that are not explicitly shown in FIG. 5, or may utilize an architecture completely different than that shown in FIG. 5.

Based on the foregoing, it should be appreciated that technologies for differentiating normal operation of an application program from error conditions to predict, diagnose, and recover from application failures are provided herein. Although the subject matter presented herein has been described in language specific to computer structural features, methodological acts, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method of generating and utilizing, in real-time, resource access patterns of an application program executing in a virtual application environment, the method comprising:
    executing, on one or more hardware processors, an application program in a virtual environment via a virtualization layer that virtualizes the application program's accessing of local resources or remote resources; and
    executing, in parallel to the execution of the application program, a process associated with utilizing resource access patterns of the application program, including:
        monitoring requests that occur during execution, from the application program, to access both local resources and remote resources;
        logging, in a resource access log, a plurality of resource access events initiated by the application program, the plurality of resource access events including at least one of (i) a timestamp indicating when the resource access occurred, (ii) an indication of an accessed resource type, or (iii) a location of the resource accessed;
        generating resource access patterns from the logged resource access events in real-time, including generating resource access patterns associated with at least one of (i) a particular time of day, (ii) responses to an event, or (iii) calls for specific resources;
        based on the generated resource access patterns,
            generating an occurrence threshold for at least one of the identified resource access patterns;
            detecting a deviation from the identified resource access patterns by the application program based at least partially on the generated occurrence threshold, the deviation being associated with at least one resource access event of the plurality of resource access events; and
            predicting one or more error conditions based at least partially on the detected deviation;
        correlating at least one of the one or more error conditions to the at least one resource access event within the resource access log based at least partially on a temporal proximity of the at least one resource access event to the at least one error condition; and
        generating a communication associated with the at least one resource access event correlated to the at least one error condition.

2. The method of claim 1, further comprising restoring an application state of the application program by replaying a portion of the resource access events from the resource access log, wherein the portion of the resource access events from the resource access log comprises one or more resource access events that occurred since a last checkpoint at which the application state was taken.

3. The method of claim 2, wherein the portion of the resource access events from the resource access log comprises one or more resource access events that occurred before an application failure of the application program.

4. The method of claim 3, wherein the portion of the resource access events from the resource access log comprises one or more resource access events that occurred since a last checkpoint of the application state was taken and before an application failure.

5. The method of claim 4, further comprising identifying the application failure by detecting the deviation from the identified resource access patterns.

6. The method of claim 1, further comprising identifying an application failure of the application program by detecting the deviation from the identified resource access patterns, the deviation comprising a sequence of resource access events having a correlation with a known error condition.

7. A computer program product comprising one or more computer readable storage media having stored thereon computer-executable instructions that are executable by one or more processors of a computer system to cause the computer system to generate and utilize, in real-time, resource access patterns of an application program executing in a virtual application environment, the computer-executable instructions including instructions that are executable to cause the computer system to perform the following:
- execute an application program in a virtualization layer that virtualizes the application program's accessing of local resources or remote resources, the virtualization layer executing in a virtual application environment on the computer;
- execute, in parallel to the execution of the application program, a process associated with utilizing resource access patterns of the application program, including:
  - monitor requests, from the application program, to access both local resources and remote resources;
  - log, in a resource access log, a plurality of resource access events initiated by the application program, the plurality of resource access events including at least one of (i) a timestamp indicating when the resource access occurred, (ii) an indication of an accessed resource type, or (iii) a location of the resource accessed;
  - generate resource access patterns from the logged resource access events in real-time, including generating resource access patterns associated with at least one of (i) a particular time of day, (ii) responses to an event, or (iii) calls for specific resources;
  - based on the generated resource access patterns,
    - generate an occurrence threshold for at least one of the identified resource access patterns;
    - detect a deviation from the identified resource access patterns by the application program based at least partially on the generated occurrence threshold, the deviation being associated with at least one resource access event of the plurality of resource access events; and
    - predict one or more error conditions based at least partially on the detected deviation;
  - correlate at least one of the one or more error conditions to the at least one resource access event within the resource access log based at least partially on a temporal proximity of the at least one resource access event to the at least one error condition; and
  - generate a communication associated with the at least one resource access event correlated to the at least one error condition.

8. The computer program product of claim 7, wherein the computer-executable instructions further include instructions that are executable to cause the computer system to restore an application state of the application program by replaying a portion of the resource access events from the resource access log, wherein the portion of the resource access events from the resource access log comprises one or more resource access events, the one or more resource access events corresponding to calls to resource application program interfaces (APIs) that write data to cached storage locations.

9. The computer program product of claim 8, wherein the portion of the resource access events from the resource access log comprises one or more resource access events, wherein the one or more resource access events correspond to calls to resource application program interfaces (APIs) that write data to cached storage locations and wherein the calls to the resource APIs occurred since a last checkpoint at which the application state was taken.

10. The computer program product of claim 8, wherein the portion of the resource access events from the resource access log comprises one or more resource access events corresponding to a writing of data that occurred before an application failure of the application program.

11. The computer program product of claim 8, wherein the portion of the resource access events from the resource access log comprises one or more resource access events corresponding to calls to resource application interfaces (APIs) that write data to cached storage locations and wherein the calls to the resource APIs occurred since a last checkpoint at which the application state was taken and before an application failure of the application program.

12. The computer program product of claim 7, wherein the computer-executable instructions further include instructions that are executable to cause the computer system to identify an application failure of the application program by detecting the deviation from the identified resource access patterns.

13. The computer program product of claim 7, wherein the computer-executable instructions further include instructions that are executable to cause the computer system to identify an application failure of the application program by detecting the deviation from the identified resource access patterns, the deviation comprising a sequence of resource access events having a correlation with a known error condition.

14. The computer program product of claim 13, wherein the computer-executable instructions further include instructions that are executable to cause the computer system to determine that the sequence of resource access events has a probability of occurrence lower than a specified threshold.

15. A system comprising:
- one or more hardware processors; and
- one or more computer-readable storage media having stored thereon that are executable by the one or more hardware processors to cause the system to generate and utilize, in real-time, resource access patterns of an application program executing in a virtual application environment, the computer-executable instructions including instructions that are executable to cause the system to perform the following:
  - execute an application program in a virtual application environment via a virtualization layer that virtualizes the application program's accessing of local resources or remote resources;
  - execute, in parallel to the execution of the application program, a process associated with utilizing resource access patterns of the application program, including:
    - monitor requests, from the application program, to access both local resources and remote resources;
    - log, in a resource access log, a plurality of resource access events initiated by the application program, the plurality of resource access events including at least one of (i) a timestamp indicating when the resource access occurred, (ii) an indication of an accessed resource type, or (iii) a location of the resource accessed;
    - generate resource access patterns from the logged resource access events in real-time, including generating resource access patterns associated with at least one of (i) a particular time of day, (ii) responses to an event, or (iii) calls for specific resources;
based on the generated resource access patterns,
generate an occurrence threshold for at least one of the identified resource access patterns;
detect a deviation from the identified resource access patterns by the application program based at least partially on the generated occurrence threshold, the deviation being associated with at least one resource access event of the plurality of resource access events; and
predict one or more error conditions based at least partially on the detected deviation;
correlate at least one of the one or more error conditions to the at least one resource access event within the resource access log based at least partially on a temporal proximity of the at least one resource access event to the at least one error condition; and
generate a communication associated with the at least one resource access event correlated to the at least one error condition.

16. The system of claim 15, wherein the computer-executable instructions further include instructions that are executable to cause the system to restore an application state of the application program by replaying a portion of the resource access events from the resource access log, wherein the portion of the resource access events from the resource access log comprises one or more resource access events that occurred since a last checkpoint at which the application state was taken.

17. The system of claim 16, wherein the portion of the resource access events from the resource access log comprises one or more resource access events that occurred before an application failure of the application program.

18. The system of claim 16, wherein the portion of the resource access events from the resource access log comprises one or more resource access events that occurred since a most recent checkpoint at which the application state was taken and before an application failure of the application program.

19. The system of claim 15, wherein the computer-executable instructions further include instructions that are executable to cause the system to identify an application failure of the application program by detecting the deviation from the identified resource access patterns.

20. The system of claim 15, wherein the computer-executable instructions further include instructions that are executable to cause the system to identify an application failure of the application program by detecting the deviation from the identified resource access patterns, the deviation comprising a sequence of resource access events having a correlation with a known error condition.

* * * * *